United States Patent
White

(10) Patent No.: US 11,384,201 B2
(45) Date of Patent: Jul. 12, 2022

(54) NON-HALOGENATED FLAME RETARDANT POLYAMIDE COMPOSITIONS

(71) Applicant: Ascend Performance Materials Operations LLC, Houston, TX (US)

(72) Inventor: Kimberly M. White, Pensacola, FL (US)

(73) Assignee: Ascend Performance Materials Operations LLC, Houston, TX (US)

(*) Notice: Subject to any disclaimer, the term of this patent is extended or adjusted under 35 U.S.C. 154(b) by 1 day.

(21) Appl. No.: 16/735,816

(22) Filed: Jan. 7, 2020

(65) Prior Publication Data

US 2020/0216613 A1    Jul. 9, 2020

Related U.S. Application Data

(60) Provisional application No. 62/789,223, filed on Jan. 7, 2019.

(51) Int. Cl.
| | |
|---|---|
| C08G 69/26 | (2006.01) |
| B29C 48/00 | (2019.01) |
| B29C 45/00 | (2006.01) |
| C08J 3/20 | (2006.01) |
| C08K 5/00 | (2006.01) |
| C08K 5/529 | (2006.01) |
| B29K 77/00 | (2006.01) |
| B29K 105/00 | (2006.01) |

(52) U.S. Cl.
CPC .......... *C08G 69/26* (2013.01); *B29C 45/0001* (2013.01); *B29C 48/022* (2019.02); *C08J 3/203* (2013.01); *C08K 5/0066* (2013.01); *C08K 5/529* (2013.01); *B29K 2077/00* (2013.01); *B29K 2105/0026* (2013.01)

(58) Field of Classification Search
CPC .................................................. C08G 69/26
See application file for complete search history.

(56) References Cited

U.S. PATENT DOCUMENTS

| | | | |
|---|---|---|---|
| 8,234,296 B1 | 7/2012 | Black | |
| 8,362,119 B2 | 1/2013 | Endtner et al. | |
| 8,940,818 B2 | 1/2015 | Futterer et al. | |
| 10,836,904 B2 | 11/2020 | Osborn et al. | |
| 2007/0054992 A1 | 3/2007 | Urata et al. | |
| 2007/0299171 A1* | 12/2007 | Couillens | C08K 5/34922 524/133 |
| 2013/0244527 A1 | 9/2013 | Sarzotti et al. | |
| 2015/0183991 A1 | 7/2015 | Yamamoto et al. | |
| 2018/0072873 A1 | 3/2018 | Höerold et al. | |
| 2018/0171112 A1 | 6/2018 | Rakotomalala et al. | |
| 2020/0308402 A1 | 10/2020 | White | |

FOREIGN PATENT DOCUMENTS

| | | |
|---|---|---|
| EP | 2256167 A1 | 12/2010 |
| EP | 2902444 A1 | 8/2015 |
| JP | 2001234062 A * | 8/2001 |
| JP | 2011012206 A | 1/2011 |
| JP | 2018065974 A * | 4/2018 |

OTHER PUBLICATIONS

English machine translation of Yamada et al., JP 2018065974 A (Year: 2018).*
English machine translation of Aramaki, JP 2001234062 A (Year: 2001).*
Snell et al., "Phenols to Sensory Testing Methods", Encyclopedia of Industrial Chemical Analysis, vol. 17, 1973, 33 pages.

* cited by examiner

*Primary Examiner* — Peter F Godenschwager
(74) *Attorney, Agent, or Firm* — Cozen O'Connor

(57) ABSTRACT

A non-halogenated flame retardant polyamide composition is disclosed which comprises a polyamide, a non-halogenated flame retardant, and a synergist. The polyamide may have a ratio of carboxylic acid to amine end groups of greater than 1.8. Products formed from the composition are also disclosed. The polyamide may comprise nylon 6,6.

11 Claims, No Drawings

NON-HALOGENATED FLAME RETARDANT POLYAMIDE COMPOSITIONS

CROSS-REFERENCE TO RELATED APPLICATION

This application claims priority to U.S. Provisional App. No. 62/789,223, filed on Jan. 7, 2019, the entire contents and disclosures of which are incorporated by reference herein.

TECHNICAL FIELD

The present disclosure relates to non-halogenated flame retardant polyamide compositions that may be used in electrical and electronic applications, including connectors, relays, terminal blocks, motors, walls plates, lighting, circuit breakers, switches, and sensors, as well as other applications.

BACKGROUND

Flame retardant compositions, including compositions comprising polymer compositions, are known in the art and are used for a variety of purposes, including in connection with electrical and electronic applications. Known compositions include varied synergists, flow modifiers, and polymers and often suffer from problems with thermal stability as well as flowability during the manufacturing process. An additional problem is that during manufacturing, molecular weight of the composition builds, resulting in increased viscosity and decreased flow, which make recycling of the final product difficult. Although flow modifiers may be included to address some of these problems, such flow modifiers present an increased cost and may also have an adverse effect on the desired viscosity.

As one example, US Pub. No. 2013/0244527 A1 claims a flame retardant fiber comprising a partially aromatic polyamide and a non-halogen flame retardant additive.

U.S. Pat. No. 8,234,296 relates generally to a non-halogen flame-retardant synthetic resin composition which contains specific (poly)phosphate compounds in combination with a layered silicate.

U.S. Pat. No. 8,940,818 is generally related to a halogen-free flame retardant for incorporation into a polymer matrix, wherein the flame retardant contains at least ammonium polyphosphate(s) and/or derivatives thereof and an oligomeric or polymeric 1,3,5-triazine derivative or mixtures of several thereof and at least one compound selected from monozinc phosphate, zinc borate, trizinc phosphate, zinc pyrophosphate, zinc polyphosphate, zinc hydroxystannate, zinc stannate, boron phosphate, monoaluminium phosphate, trialuminium phosphate, aluminium metaphosphate and mixtures thereof, precondensed melamine derivatives, melamine salts and adducts, ethylenediamine phosphate, piperazine phosphate, piperazine polyphosphate, 1,3,5-trihydroxyethyl isocyanurate, 1,3,5-triglycidyl isocyanurate and triallyl isocyanurate.

U.S. Pat. No. 8,362,119 relates generally to a thermoplastic moulding composition comprising unbranched, thermoplastic polyamide, a phosphinic or diphosphinic salt, a nitrogen-containing flame retardant combination and also at least one oxygen-containing, nitrogen-containing or sulphur-containing metal compound and also to the production and the use of the inventive moulding compositions for production of fibres, of foils and of mouldings of any type.

US Pub. No. 2007/0054992 relates generally to a flame-retardant resin composition which is excellent in flame retardancy and excellent in low water-absorbing, property and exhibits a small dimensional change and a small decrease in insulating properties. The flame-retardant resin compositions contains: (A) an aliphatic polyamide resin; (B) an aromatic polyamide resin; (C) specific flame retardants; and (D) an inorganic filler.

Despite the variety of compositions and materials proposed, conventional products have much to be desired in terms of manufacturing costs, processability, and product properties.

SUMMARY

In some embodiments, the present disclosure is directed to a flame retardant polyamide composition comprising a polyamide, a non-halogenated flame retardant, and a synergist, wherein the polyamide has a ratio of carboxylic acid end groups to amine end groups of greater than 1.8. The composition may further comprise one or more additives. The one or more additives may comprise a flow modifier, a heat stabilizer, a filler, or combinations thereof. The weight average molecular weight of the composition may be from 20,000 to 100,000. The z-average molecular weight may be from 50,000 to 600,000. The composition may comprise from 40 to 70 wt. % nylon 6,6, based on the total weight of the composition. The composition may comprise from 5 to 25 wt. % non-halogenated flame retardant, based on the total weight of the composition. The composition may comprise from 0.1 to 15 wt. % synergist, based on the total weight of the composition. The composition may further comprise from 5 to 45 wt. % fiberglass, based on the total weight of the composition. The composition may comprise from 0.05 to 5 wt. % heat stabilizer, based on the total weight of the composition. The non-halogenated flame retardant may comprise a phosphorus flame retardant. The synergist may comprise a polyphosphate. In some aspects, the synergist may comprise melamine polyphosphate. The polyamide may comprise less than 50 µeq/gram amine end groups. The polyamide may comprise nylon 6,6. In some aspects, the polyamide comprises nylon 6,6 in combination with at least one other polymer.

In some embodiments, the present disclosure is directed to a molded flame retardant polyamide product formed from a composition comprising a polyamide, a non-halogenated flame retardant, and a synergist, wherein the polyamide has a ratio of carboxylic acid end groups to amine end groups of greater than 1.8. The composition may further comprise one or more additives. The one or more additives may comprise a flow modifier, a heat stabilizer, a filler, or combinations thereof. The weight average molecular weight of the composition may be from 20,000 to 100,000. The z-average molecular weight may be from 45,000 to 600,000. The composition may comprise from 40 to 70 wt. % nylon 6,6, based on the total weight of the composition. The composition may comprise from 5 to 25 wt. % non-halogenated flame retardant, based on the total weight of the composition. The composition may comprise from 0.1 to 15 wt. % synergist, based on the total weight of the composition. The composition may further comprise from 5 to 45 wt. % fiberglass, based on the total weight of the composition. The composition may comprise from 0.05 to 5 wt. % heat stabilizer, based on the total weight of the composition. The non-halogenated flame retardant may comprise a phosphorus flame retardant. The synergist may comprise a polyphosphate. In some aspects, the synergist may comprise melamine polyphosphate. The polyamide may comprise less than 50 µeq/gram amine end groups. In some aspects, the polyamide comprises nylon 6,6 in combination with at least one other polymer.

In some embodiments, the present disclosure is directed to a method of forming a molded product comprising: a) forming a polyamide having a ratio of carboxylic acid to amine end groups of greater than 1.8; b) compounding the polyamide with a non-halogenated flame retardant and a synergist comprising a phosphorus-containing compound to form a compounded composition; and c) molding the compounded composition to form the molded product. The composition may further comprise one or more additives. The one or more additives may comprise a flow modifier, a heat stabilizer, a filler, or combinations thereof. The weight average molecular weight of the product may be from 20,000 to 100,000. The z-average molecular weight of the product may be from 45,000 to 600,000. The product may comprise from 40 to 70 wt. % polyamide, based on the total weight of the product. The product may comprise from 5 to 25 wt. % non-halogenated flame retardant, based on the total weight of the product. The product may comprise from 0.1 to 15 wt. % synergist, based on the total weight of the product. The product may further comprise from 5 to 45 wt. % fiberglass, based on the total weight of the product. The composition may comprise from 0.05 to 5 wt. % heat stabilizer, based on the total weight of the composition. The non-halogenated flame retardant may comprise a phosphorus flame retardant. The synergist may comprise a polyphosphate. In some aspects, the synergist may comprise melamine polyphosphate. In some aspects, the polyamide comprises nylon 6,6 in combination with at least one other polymer.

In some embodiments, the present disclosure is directed to a flame retardant polyamide composition comprising: from 40 to 70 wt. % of a polyamide; from 5 to 25 wt. % of a non-halogenated flame retardant; from 0.1 to 15 wt. % of a synergist; from 5 to 45 wt. % fiberglass; and from 0.05 to 5 wt. % of a heat stabilizer, wherein the polyamide has a ratio of carboxylic acid end groups to amine end groups of greater than 1.8. In some aspects, the polyamide comprises nylon 6,6 in combination with at least one other polymer.

In some embodiments, the present disclosure is directed to a flame retardant polyamide composition comprising: from 40 to 70 wt. % of a polyamide; from 5 to 25 wt. % of a non-halogenated flame retardant; from 0.1 to 15 wt. % of a synergist; and from 0.05 to 5 wt. % of a heat stabilizer, wherein the polyamide has a ratio of carboxylic acid end groups to amine end groups of greater than 1.8. In some aspects, the polyamide comprises nylon 6,6 in combination with at least one other polymer.

In some embodiments, the present disclosure is directed to a method for controlling the RV of a polyamide, the method comprising: determining the desired RV for a polyamide; adjusting the value of at least one of the amine end groups, the inert end groups, or the carboxylic acid end groups; wherein the polyamide has a ratio of carboxylic acid end groups to amine end groups of greater than 1.8. In some aspects, the desired RV is at least 20 or at least 35. In some aspects, a polymerization catalyst, such as sodium hypophosphite, is excluded.

In some embodiments, the present disclosure is directed to a flame retardant polyamide composition comprising a polyamide, a non-halogenated flame retardant, and a synergist, wherein the composition meets at least one of the following conditions: (a) the weight average molecular weight of the final composition is less than 300% greater than the weight average molecular weight of a starting polyamide resin; (b) the number average molecular weight of the final composition is less than 100% greater than the number average molecular weight of a starting polyamide resin; (c) the Z-average molecular weight of the final composition is less than 100% greater than the Z-average molecular weight of a starting polyamide resin; (d) the polydispersity index of the final composition is less than 300% greater than the weight average molecular weight of a starting polyamide resin; or (e) the intrinsic viscosity of the final composition is less than 100% greater than the intrinsic viscosity of a starting polyamide resin.

DETAILED DESCRIPTION

Overview

The present disclosure is directed, in part, to a flame retardant polyamide composition. The composition may comprise a polyamide, a flame retardant, and a synergist. The polyamide may comprise nylon 6,6, which may be present in an amount from 40 to 70 wt. % based on the total weight of the composition. The nylon 6,6 may have a ratio of carboxylic to amine end groups of at least 1.8, e.g., from 1.9 to 3. The flame retardant may be non-halogenated and may be present from 5 to 25 wt. %, based on the total weight of the composition. The synergist may comprise a phosphorus-containing compound and may be present from 0.1 to 10 wt. %, based on the total weight of the composition. It has been found that the compositions described herein are thermally stable and have reduced molecular weight increase during compounding and molding.

The inventors have found that by utilizing a particular polyamide having specific characteristics, in particular controlled amine end groups, compositions having synergistic features are formed. Without being bound by theory, it is postulated that the use of a polyamide having lowered reactivity, e.g., through lower amine end groups, increased inert acetic acid end groups, and/or increased carboxylic acid end groups, have resulted in the improved thermal stability and other desirable characteristics. As an additional benefit, the molecular weight of the composition, from initial formation to final compounding and molding, is controlled.

Also, the inventors have found that the some of the disclosed compositions yield products with reduced plating out and corrosion of metal components. These improvements advantageously result in products with improved durability and performance.

In some aspects, no flow modifier is needed to achieve the desired viscosity and flowability of the composition.

In some embodiments, the composition is prepared and then compounded and molded into a final molded product.

In some aspects, the molecular weight of the composition (Mw, Mn, and/or Mz) may be controlled by means separate from or in addition to the ratio of end groups described herein. Such means include processing changes, e.g., change in moisture content, screw speed, and/or screw design. Another means includes using a resin with a relatively lower starting Rv, e.g., an RV of less than 36, such as an RV between 20 and 36.

Particularly preferred polyamides include nylon 6,6, as well as co-polymers, blends, and alloys of nylon 6,6 with nylon 6. Other embodiments include nylon derivatives, co-polymers, ter-polymers, blends and alloys containing or prepared from nylon 6,6 or nylon 6, co-polymers or ter-polymers with the repeat units noted above including but not limited to: N6T/6,6, N612, N6/6,6, N6I/6,6, N11, and N12, wherein "N" means Nylon. Another preferred embodiment includes High Temperature Nylons ("HTN") as well as blends, derivatives, co-polymers or ter-polymers containing them. Furthermore, another preferred embodiment includes long chain aliphatic polyamide made with long chain diacids as well as blends, derivatives or co-polymers containing them. When blends of polymers are included the reactivity of the end groups of all polymers is desirably low. For example, when blends of polymers are used, the end group ratio described herein may apply to both the polyamide component and any other component (if applicable).

Composition Components

As described herein, the present disclosure is directed to a flame retardant polyamide composition that comprises a polyamide, e.g., nylon 6,6, in combination with a non-halogenated flame retardant and a synergist, e.g., a synergist containing a phosphorus-containing compound. Additional components that may be present in the composition are described herein and include, but are not limited to, heat stabilizers, metals, flow modifiers, fillers, and combinations thereof.

The composition may be formed by combining the above components and then extruding them through an extruder.

As described herein, one major advantage to the composition described herein is that during compounding and molding of the composition, the expected increase in molecular weight is controlled and limited. In some aspects, the initial weight average molecular weight of the polyamide is at least 20,000, e.g., at least 22,500, at least 25,000 or at least 27,500. In terms of upper limits the weight average molecular weight of the initial polyamide is 45,000 or less, e.g., 42,500 or less, 40,000 or less, or 37,500 or less. In terms of ranges, the weight average molecular weight of the initial polyamide is from 20,000 to 45,000, e.g., from 22,500 to 42,500, from 25,000 to 40,000, or from 27,500 to 37,500. In some aspects, the initial number average molecular weight of the polyamide is at least 10,000, e.g., at least 12,500, at least 15,000 or at least 17,500. In terms of upper limits the number average molecular weight of the initial polyamide is 30,000 or less, e.g., 27,500 or less, 25,000 or less, or 22,500 or less. In terms of ranges, the number average molecular weight of the initial polyamide is from 10,000 to 30,000, e.g., from 12,500 to 27,500, from 15,000 to 25,000, or from 17,500 to 22,500. In some aspects, the initial Z-average molecular weight of the polyamide is at least 30,000, e.g., at least 35,000, at least 40,000 or at least 45,000. In terms of upper limits the Z-average molecular weight of the initial polyamide is 70,000 or less, e.g., 65,000 or less, 60,000 or less, or 55,000 or less. In terms of ranges, the Z-average molecular weight of the initial polyamide is from 30,000 to 70,000, e.g., from 35,000 to 65,000, from 40,000 to 60,000, or from 45,000 to 55,000. The polydispersity index of the initial polyamide may be at least 1.2, e.g., at least 1.3, at least 1.4, at least 1.5, or at least 1.6. In terms of upper limits, the polydispersity index of the initial polyamide may be less than 2, e.g., less than 1.95, less than 1.9, less than 1.85, or less than 1.8. In terms of ranges, the polydispersity index of the initial polyamide may be from 1.2 to 2, e.g., from 1.3 to 1.95, from 1.3 to 1.9, from 1.4 to 1.85, from 1.5 to 1.8, or from 1.6 to 1.8. The intrinsic viscosity, in dl/g, of the initial polyamide may be at least 2, e.g., at least 2.1, at least 2.2, at least 2.3, or at least 2.4. In terms of upper limits, the intrinsic viscosity, in dl/g, of the initial polyamide may be less than 3, e.g., less than 2.9, less than 2.8, less than 2.7, or less than 2.6. In terms of ranges, the intrinsic viscosity, in dl/g, of the initial polyamide may be from 2 to 3, e.g., from 2.1 to 2.9, from 2.2 to 2.8, from 2.3 to 2.7, or from 2.4 to 2.6.

After compounding and extrusion or injection molding, the final product may have a weight average molecular weight of at least 20,000, e.g., at least 25,000, at least 30,000 or at least 35,000. In terms of upper limits, the weight average molecular weight of the final product is 100,000 or less, e.g., 97,500 or less, 95,000 or less, or 92,500 or less. In terms of ranges, the weight average molecular weight of the final product is from 20,000 to 100,000, e.g., from 25,000 to 97,500, from 30,000 to 95,000, or from 35,000 to 92,500. In some aspects, the number average molecular weight of the final product is at least 10,000, e.g., at least 12,500, at least 15,000 or at least 17,500. In terms of upper limits the number average molecular weight of the final product is 40,000 or less, e.g., 37,500 or less, 35,000 or less, or 32,500 or less. In terms of ranges, the number average molecular weight of the final product is from 10,000 to 40,000, e.g., from 12,500 to 37,500, from 15,000 to 35,000, or from 17,500 to 32,500. In some aspects, the Z-average molecular weight of the final product is at least 30,000, e.g., at least 35,000, at least 40,000 or at least 45,000. In terms of upper limits the Z-average molecular weight of the final product is 550,000 or less, e.g., 500,000 or less, 400,000 or less, or 300,000 or less. In terms of ranges, the Z-average molecular weight of the final product is from 30,000 to 550,000, e.g., from 35,000 to 500,000, from 40,000 to 400,000, or from 45,000 to 300,000. The polydispersity index of the final product may be at least 1.8, e.g., at least 1.9, at least 2, or at least 2.1. In terms of upper limits, the polydispersity index of the final product may be less than 4, e.g., less than 3.85, less than 3.5, or less than 3. In terms of ranges, the polydispersity index of the final product may be from 1.8 to 4, e.g., from 1.9 to 3.85, from 2 to 3.5, or from 2.1 to 3. The intrinsic viscosity, in dl/g, of the final product may be at least 2, e.g., at least 2.1, at least 2.2, at least 2.3, or at least 2.4. In terms of upper limits, the intrinsic viscosity, in dl/g, of the final product may be less than 4, e.g., less than 3.9, less than 3.8, less than 3.7, or less than 3.6. In terms of ranges, the intrinsic viscosity, in dl/g, of the initial polyamide may be from 2 to 4, e.g., from 2.1 to 3.9, from 2.2 to 3.8, from 2.3 to 3.7, or from 2.4 to 3.6.

In terms of increases, the percent increase in weight average molecular weight from the initial polyamide to the final product may be at least 1%, e.g., at least 5%, at least 10%, or at least 20%. In terms of upper limits, the percent increase in weight average molecular weight from the initial polyamide to the final product may be less than 300%, e.g., less than 250%, less than 200%, or less than 100%. In terms of ranges, the percent increase in weight average molecular weight from the initial polyamide to the final product may be from 1% to 300%, e.g., from 5% to 250%, from 10% to 200%, from 20 to 150%, or from 20% to 100%. In terms of increases, the percent increase in number average molecular weight from the initial polyamide to the final product may be at least 1%, e.g., at least 5%, at least 10%, or at least 15%. In terms of upper limits, the percent increase in number average molecular weight from the initial polyamide to the final product may be less than 100%, e.g., less than 50%, less than 40%, or less than 35%. In terms of ranges, the percent increase in number average molecular weight from the initial polyamide to the final product may be from 1% to 100%, e.g., from 5% to 50%, from 10% to 25%, or from 15% to 20%. In terms of increases, the percent increase in Z-average molecular weight from the initial polyamide to the final product may be at least 1%, e.g., at least 5%, at least 10%, or at least 20%. In terms of upper limits, the percent increase in Z-average molecular weight from the initial polyamide to the final product may be less than 300%, e.g., less than 250%, less than 200%, or less than 100%. In terms of ranges, the percent increase in Z-average molecular weight from the initial polyamide to the final product may be from 1% to 300%, e.g., from 5% to 250%, from 10% to 200%, or from 20% to 100%. In terms of increases, the percent increase in polydispersity index from the initial polyamide to the final product may be at least 1%, e.g., at least 5%, at least 10%, or at least 20%. In terms of upper limits, the percent increase in polydispersity index from the initial polyamide to the final product may be less than 200%, e.g., less than 100%, less than 50%, or less than 25%. In terms of ranges, the percent increase in polydispersity index from the initial polyamide to the final product may be from 1% to 200%, e.g., from 5% to 100%, from 10% to 50%, or from 20% to 25%. In terms of increases, the percent increase in weight average molecular weight from the initial polyamide to the final product may be at least 1%, e.g., at least 5%, at least 10%, or at least 20%. In terms of upper limits, the percent increase in intrinsic viscosity from the initial polyamide to the final product may be less than 100%, e.g., less than 75%, less than 50%, or less than 25%. In terms of ranges, the percent increase in intrinsic viscosity from the initial polyamide to the final product may be from 1% to 100%, e.g., from 5% to 75%, from 10% to 50%, or from 20% to 25%.

Non-Halogenated Flame Retardant

Exemplary non-halogenated flame retardants include phosphorus- or melamine-containing flame retardants. Melamine flame retardants are known in the art and include melamine phosphates and melamine cyanurate. Phosphinate flame retardants, including those diethylaluminum phosphinates sold by Clariant, such as Exolit® OP-1230 and Exolit® OP-1400 may be used in the composition described herein. Melamine phosphates include melamine phosphate, dimelamine phosphate, melamine pyrophosphate, melamine polyphosphates, melam polyphosphates, melam polyphosphates, melamine condensation products, or mixtures thereof. Phosphinate flame retardants may be desirable because of their thermal stability in nylon. Other phosphorus flame retardants that may be used in the composition herein include phosphine oxides, phosphonate oligomers, aluminum phosphite (including V, VI, VII, VIII, etc), polyphosphazenes and alkyl-DOPO derivatives. Exemplary phosphazenes are disclosed in US Pub. Nos. 2018/0072873 and 2018/0171112, the entireties of which are incorporated by reference herein, and include a phosphazene of the general formula (III) or (IV)

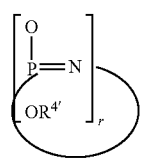

(III)

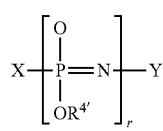

(IV)

wherein R 4 and R 4' are the same or different and are C1-C20-alkyl, C6-C30-aryl, C6-C30-arylalkyl or C6-C30-alkyl substituted aryl, and X is a group —N═P(OPh) 3 or —N═P(O)OPh and Y is a group —P(OPh) 4 or —P(O)(OPh) 2; as component C from 0 to 30% by weight of an inorganic zinc compound, and as component D from 0 to 50% by weight of a nitrogen-containing flame retardant. Components A and B may be used alone or in combination with each other. Components C and D can be used in combination with component A and/or B. Exemplary alkyl-DOPO derivatives are disclosed in US Pub. No. 2013/0136911, the entirety of which is incorporated by reference herein, and include polycondensates of a) at least one phosphorus-containing monomer selected from adducts of a1) 9,10-dihydro-9-oxa-10-phosphaphenanthrene-10-oxide (DOPO) and/or nuclear-substitution DOPO derivatives in a2) unsaturated compounds from the group of mono-and multivalent carboxylic acids and the anhydrides thereof and b) at least one ester-forming monomer selected from the group of mono- or multivalent alcohols and mixtures thereof.

Further DOPO derivatives include:

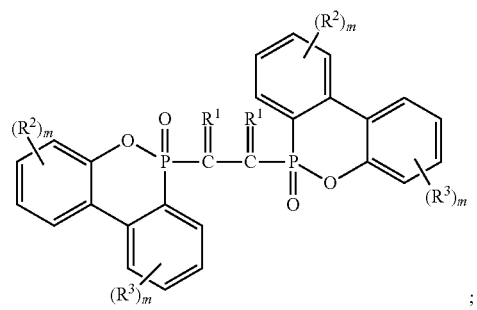

wherein R1 is oxygen, and R2 and R3 are each independently hydrogen, C1-C15 alkyl, C6-C12 aryl, C7-C15 aralkyl, or C7-C15 alkaryl, and wherein m is independently selected

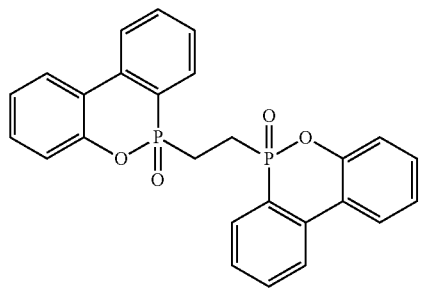

from 1-4.

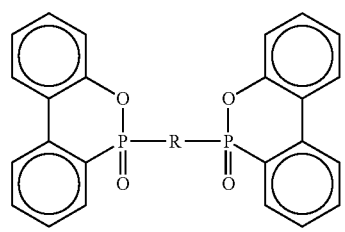

wherein R is methyl, ethyl, propyl, butyl, etc; and

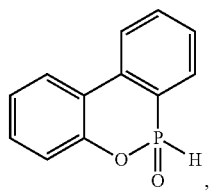

wherein the H is replaced with an R group having one or more carbons. The above recited flame retardants may be alone or in combination with each other.

In terms of lower limits, the non-halogenated flame retardant is present in an amount of at least 5 wt. %, based on the total weight of the composition, e.g., at least 7.5 wt. %, at least 10 wt. %, or at least 12.5 wt. %. In terms of upper limits, the non-halogenated flame retardant is present in an amount of less than 25 wt. %, e.g., less than 22.5 wt. %, less than 20 wt. %, or less than 17.5 wt. %. In terms of ranges, the non-halogenated flame retardant is present from 5 to 25 wt. %, e.g., from 7.5 to 22.5 wt. %, from 10 to 20 wt. %, or from 12.5 to 17.5 wt. %.

Polyamide

As used herein, polyamide composition and like terminology refers to compositions containing polyamides including copolymers, terpolymers, polymer blends, alloys and derivatives of polyamides. Further, as used herein, a "polyamide" refers to a polymer, having as a component, a polymer with the linkage of an amino group of one molecule and a carboxylic acid group of another molecule. In some aspects, the polyamide is the component present in the greatest amount. For example, a polyamide containing 40 wt. % nylon 6, 30 wt. % polyethylene, and 30 wt. % polypropylene is referred to herein as a polyamide since the nylon 6 component is present in the greatest amount. Additionally, a polyamide containing 20 wt. % nylon 6, 20 wt. % nylon 6,6, 30 wt. % polyethylene, and 30 wt. % polypropylene is also referred to herein as a polyamide since the nylon 6 and nylon 6,6 components, in total are the components present in the greatest amount.

Exemplary polyamides and polyamide compositions are described in Kirk-Othmer, Encyclopedia of Chemical Technology, Vol. 18, pp. 328371 (Wiley 1982), the disclosure of which is incorporated by reference.

Briefly, polyamides are generally known as compounds that contain recurring amide groups as integral parts of the main polymer chains. Linear polyamides are of particular interest and may be formed from condensation of bifunctional monomers. Polyamides are frequently referred to as nylons. Although they generally are considered as condensation polymers, polyamides also are formed by addition polymerization. This method of preparation is especially important for some polymers in which the monomers are cyclic lactams, e.g., Nylon 6. Particular polymers and copolymers and their preparation are seen in the following patents: U.S. Pat. Nos. 4,760,129; 5,504,185; 5,543,495; 5,698,658; 6,011,134; 6,136,947; 6,169,162; 7,138,482; 7,381,788; and 8,759,475.

There are numerous advantages of using polyamides, specifically nylons, in commercial applications. Nylons are generally chemical and temperature resistant, resulting in superior performance to other particles. They are also known to have improved strength, elongation, and abrasion resistance as compared to other polymers. Nylons are also very versatile, allowing for their use in a variety of applications.

A class of polyamides particularly preferred for some applications includes High Temperature Nylons (HTN's) as are described in Glasscock et al., High Performance Polyamides Fulfill Demanding Requirements for Automotive Thermal Management Components, (DuPont), http://www2.dupont.com/Automotive/en_US/assets/downloads/knowledg e%20center/HTN-whitepaper-R8.pdf available online Jun. 10, 2016. Such polyamides typically include one or more of the structures seen in the following:

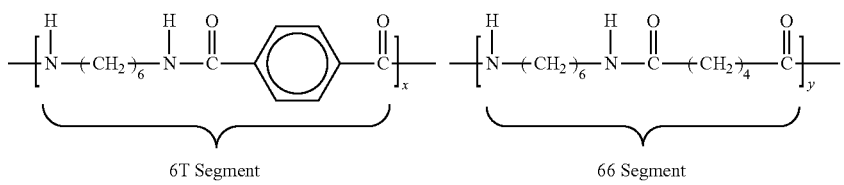

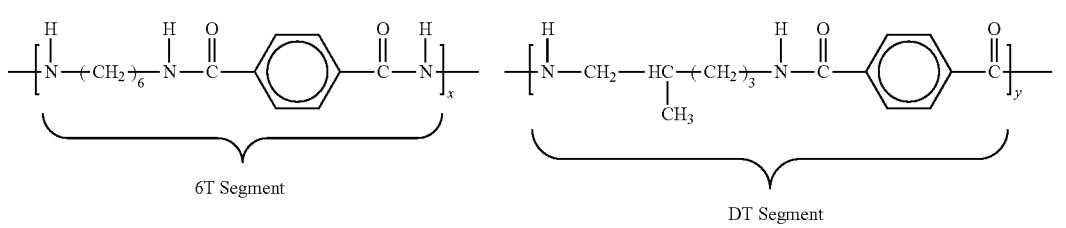

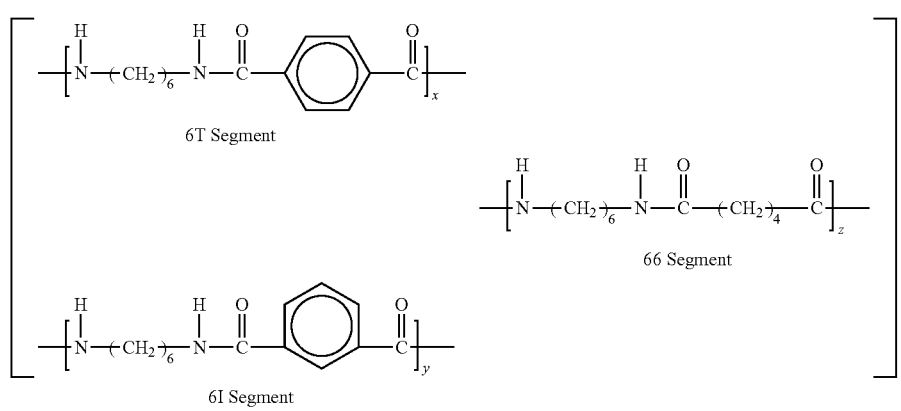

6T/6I/66

Non-limiting examples of polymers included in the polyamides include polyamides, polypropylene and copolymers, polyethylene and copolymers, polyesters, polystyrenes, polyurethanes, and combinations thereof.

Melt points of nylon microfiber products described herein, including copolymers and terpolymers, may be between 223° C. and 390° C., e.g., from 223 to 380, or from 225° C. to 350° C. Additionally, the melt point may be greater than that of conventional nylon 6,6 melt points depending on any additional polymer materials that are added.

Other polymer materials that can be used in the compositions of the disclosure include both addition polymer and condensation polymer materials such as polyolefin, polyacetal, polyamide (as previously discussed), polyester, cellulose ether and ester, polyalkylene sulfide, polyarylene oxide, polysulfone, modified polysulfone polymers and mixtures thereof. Preferred materials that fall within these generic classes include polyamides, polyethylene, polybutylene terephthalate (PBT), polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. Nylon copolymers embodied herein, can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a C6 and a C10 blend of diacids. A nylon 6-6,6-6,10 is a nylon manufactured by copolymerization of epsilonaminocaproic acid, hexamethylene diamine and a blend of a C6 and a C10 diacid material.

In some aspects, polyethylene may be used in the composition of the disclosure. The polyethylene useful in the process of this embodiment of the subject disclosure preferably may have a melt index between about 5 grams/10 min and about 200 grams/10 min and, e.g., between about 17 grams/10 min and about 150 grams/10 min. The polyethylene should preferably have a density between about 0.85 grams/cc and about 1.1 grams/cc and, e.g., between about 0.93 grams/cc and about 0.95 grams/cc. Most preferably, the melt index of the polyethylene is about 150 and the density is about 0.93.

The blend or copolymer of polyethylene and nylon can be formed in any suitable manner. Typically, the nylon compound will be nylon 6,6; however, other polyamides of the nylon family can be used. Also, mixtures of nylons can be used. In one specific example, polyethylene is blended with a mixture of nylon 6 and nylon 6,6. The polyethylene and nylon polymers are typically supplied in the form of pellets, chips, flakes, and the like. The desired amount of the polyethylene pellets or chips can be blended with the nylon pellets or chips in a suitable mixing device such as a rotary drum tumbler or the like, and the resulting blend can be introduced into the feed hopper of the conventional extruder or the melt blowing line.

Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinyl alcohol materials can be crosslinked using hydroxyl reactive materials such as monoaldehydes, such as formaldehyde, ureas, melamine-formaldehyde resin and its analogues, boric acids and other inorganic compounds, dialdehydes, diacids, urethanes, epoxies and other known crosslinking agents. Crosslinking technology is a well-known and understood phenomenon in which a crosslinking reagent reacts and forms covalent bonds between polymer chains to substantially improve molecular weight, chemical resistance, overall strength and resistance to mechanical degradation.

One preferred mode is a polyamide comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning calorimeter (DSC) analysis reveals a single polymeric material to yield improved stability when contacted with high temperature, high humidity and difficult operating conditions. Preferred materials for use in the blended polymeric systems include nylon 6; nylon 6,6; nylon 6,10; nylon (6-6,6-6,10) copolymers and other linear generally aliphatic nylon compositions.

A suitable polyamide may include for example, 20% nylon 6, 60% nylon 6,6 and 20% by weight of a polyester. The polyamide may include combinations of miscible polymers or combinations of immiscible polymers. In some aspects, the composition is free of aromatic polyamides.

In some aspects, the polyamide may include nylon 6. In terms of lower limits, the polyamide may include nylon 6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 6,6. In terms of lower limits, the polyamide may include nylon 6,6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6,6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6,6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide is primarily nylon 6,6, e.g., at least 50 wt. %, at least 60 wt. %, at least 70 wt. %, at least 80 wt. %, at least 90 wt. %, at least 95 wt. %, or 100 wt. % nylon 6,6.

In some aspects, the polyamide may include nylon 6I. In terms of lower limits, the polyamide may include nylon 6I in an amount of at least 0.1 wt. %, e.g., at least 0.5 wt. %, at least 1 wt. %, at least 5 wt. %, at least 7.5 wt. %, or at least 10 wt. %. In terms of upper limits, the polyamide may include nylon 6I in an amount of 50 wt. % or less, 40 wt. % or less, 35 wt. % or less, 30 wt. % or less, 25 wt. % or less, or 20 wt. % or less. In terms of ranges, the polyamide may comprise nylon 6I in an amount from 0.1 to 50 wt. %, e.g., from 0.5 to 40 wt. %, from 1 to 35 wt. %, from 5 to 30 wt. %, from 7.5 to 25 wt. %, or from 10 to 20 wt. %.

In some aspects, the polyamide may include nylon 6T. In terms of lower limits, the polyamide may include nylon 6T in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6T in an amount of 50 wt. % or less, 47.5 wt. % or less, 45 wt. % or less, 42.5 wt. % or less, 40 wt. % or less, or 37.5 wt. % or less. In terms of ranges, the polyamide may comprise nylon 6T in an amount from 0.1 to 50 wt. %, e.g., from 1 to 47.5 wt. %, from 5 to 45 wt. %, from 10 to 42.5 wt. %, from 15 to 40 wt. %, or from 20 to 37.5 wt. %.

Block copolymers are also useful in the process of this disclosure. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, are known to be solution spun with relative ease because they are soluble at low pressures and temperatures. It is envisioned these can be melt spun per the instant disclosure as one method of making fibers.

There is a substantial advantage to forming polymeric compositions comprising two or more polymeric materials in polymer admixture, alloy format or in a crosslinked chemically bonded structure. Without being bound by theory, it is believed such polymer compositions improve physical properties by changing polymer attributes such as improving polymer chain flexibility or chain mobility, overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material.

The polyamide may have a relative viscosity (RV) of at least 20, e.g., at least 25, at least 30, or at least 35. In terms of upper limits, the polyamide may have an RV of less than 70, e.g., less than 60, less than 55, or less than 50. In terms of ranges, the polyamide may have an RV from 20 to 70, e.g., from 25 to 60, from 30 to 55, or from 35 to 50.

The polyamide end groups may be controlled in order to achieve the desired properties. Nylon 6,6, for example, contains amino end groups and acid end groups. The acid end groups include inert acetic acid end groups and reactive carboxylic acid end groups. In some aspects, the amine end groups are present in an amount of less than 50 µteq/gram polyamide, e.g., less than 45 µteq/gram, less than 40 µteq/gram, or less than 35 µteq/gram. In terms of lower limits, the amine end groups are present in an amount of at least 5 µteq/gram, e.g., at least 10 µteq/gram, at least 15 µteq/gram, or at least 20 µteq/gram. In terms of ranges, the amine end groups may be present in an amount from 5 to 50 µteq/gram, e.g., from 10 to 45 µteq/gram, from 15 to 40 µteq/gram, or from 20 to 35 µteq/gram.

As used herein, delta end groups (DEG or DEGs) are defined as the quantity of amine ends (—NH2) less the quantity of carboxylic acid ends (—COOH). DEG calculation methods are well known.

As noted above, the base polyamide composition utilizes particular ranges and/or limits of DEG levels. In some embodiments, the base polyamide composition has a DEG level ranging from −30 µteq/gram to −90 µteq/gram, e.g., from −35 µteq/gram to −85 µteq/gram, from −40 µteq/gram to −80 µteq/gram, from −45 µteq/gram to −75 µteq/gram, from −50 µteq/gram to −70 µteq/gram, from −55 µteq/gram to −65 µteq/gram, from −60 µteq/gram to −65 µteq/gram, from −45 µteq/gram to −65 µteq/gram, from −45 µteq/gram to −60 µteq/gram, −50 µteq/gram to −65 µteq/gram, or from −55 to −60 µteq/gram. In terms of lower limits, the base polyamide composition may have a DEG level greater than −90 µteq/gram, greater than −85 µteq/gram, greater than −80 µteq/gram, greater than −75 µteq/gram, greater than −70 µteq/gram, greater than −65 µteq/gram, greater than −60 µteq/gram, greater than −55 µteq/gram, or greater than −50 µteq/gram. In terms of upper limits, the base polyamide composition may have a DEG level less than −30 µteq/gram, e.g., less than −35 µteq/gram, less than −40 µteq/gram, less than −45 µteq/gram, less than −50 µteq/gram, less than −55 µteq/gram, or less than −60 µteq/gram. These specific DEG levels have also been found to provide for the unexpected combination of advantageous, synergistic properties in the final product, following compounding, as described herein.

In some cases, DEG level may be obtained/achieved/controlled by controlling the amount of excess hexamethylene diamine (HMD) in the polymerization reaction mixture. HMD is believed to be more volatile than the (di) carboxylic acids that are employed in the reaction, e.g. adipic acid. The HMD and the carboxylic acids act to balance the formula (based on the theoretical values for the end groups), and the balance between the two (and hence the DEG) can be adjusted to achieve desired properties in the polyamide compositions. In some cases, no excess HMD is added to the polymerization reaction mixture. In some cases, adipic acid is added to the polymerization reaction mixture.

In some cases, the DEG level may be obtained/achieved/controlled via the incorporation of (mono) acids and/or (mono) amines, e.g., by "capping" some of the end structures to arrive at the desired DEG level, e.g., the desired end group balance.

In some cases, the utilization of monofunctional end capping has been found to provide the surprising benefit of controlling, e.g., slowing, the rate of polymerization. Without being bound by theory, it is believed that the capping (1) limits the amount of reactive ends; and (2) limits the degree of polymerization to a finite number. In some cases, the more end capping that is employed, the lower the (maximum) molecular weight can be (at 100% conversion). Both the former and latter may be achieved by creating high negative DEG systems. The monofunctional acid and/or amine addition will increase negative DEG level.

In one embodiment, the (mono) acids and/or (mono) amines are incorporated at levels ranging from 1 and 40 µeq/gram, e.g., from 1 µeq/gram to 35 µeq/gram, from 3 µeq/gram to 35 µeq/gram, from 3 µeq/gram to 30 µeq/gram, from 5 µeq/gram to 30 µeq/gram, from 5 µeq/gram to 25 µeq/gram, from 7 µeq/gram to 25 µeq/gram, from 7 µeq/gram to 20 µeq/gram, from 10 µeq/gram to 20 µeq/gram, or from 10 µeq/gram to 15 µeq/gram. In terms of upper limits, the (mono) acids and/or (mono) amines may be incorporated at levels less than 40 µeq/gram, e.g., less than 35 µeq/gram, less than 30 µeq/gram, less than 25 µeq/gram, less than 20 µeq/gram, or less than 15 µeq/gram. In terms of lower limits, the (mono) acids and/or (mono) amines may be incorporated at levels greater than 1 µeq/gram, e.g., greater than 3 µeq/gram, greater than 5 µeq/gram, greater than 7 µeq/gram, or greater than 10 µeq/gram.

Exemplary (mono) acids include but are not limited to acetic acid, proprionic acid, butyric acid, valeric acid, hexanoic acid, octanoic acid, palmitic acid, myristic acid, decanoic acid, undecanoic acid, dodecanoic acid, oleic acid, or stearic acid, or any combinations thereof. Exemplary (mono) amines include but are not limited to benzylamine, ethylamine, propylamine, butylamine, pentylamine, hexylamine, 2-ethyl-1-hexylamine, heptylamine, octylamine, nonylamine, decylamine, undecylamine, dodecylamine, amylamine, tert-butyl amine, tetradecylamine, hexadecylamine, or octadecylamine, or any combinations thereof.

Surprisingly and unexpectedly, it has been found that by controlling the ratio of carboxylic acid end groups to amine end groups in the polyamide resin, increases in weight average molecular weight, number average molecular weight, z-average molecular weight, polydispersity index, and intrinsic viscosity are minimized for the polyamide resin, during the compounding process. In some aspects, the ratio of carboxylic acid end groups to amine end groups in the polyamide resin is greater than 1.8, e.g., greater than 1.9, greater than 2, greater than 2.1, greater than 2.2, greater than 2.3, greater than 2.4, greater than 2.5, greater than 2.6, or greater than 2.7. In terms of upper limits, the ratio of carboxylic acid end groups to amine end groups in the polyamide resin is 3:1 or less, e.g., 2.975:1 or less, 2.95:1 or less, 2.925:1 or less, 2.9:1 or less, 2.875:1 or less, 2.85:1 or less, 2.825:1 or less, 2.8:1 or less, 2.775:1 or less, 2.75:1, 2.725:1 or less, or 2.7:1 or less. In terms of ranges, the ratio of carboxylic acid end groups to amine end groups in the polyamide resin may be from 1.81:1 to 3:1, e.g., from 1.9:1 to 3:1, from 2:1 to 3:1, from 2.1:1 to 2.975:1, from 2:1 to 2.95:1, from 2.2:1 to 2.925:1, from 2.3:1 to 2.9:1, or from 2.4:1 to 2.7:1, including all ranges and values in between.

The amounts of amino end groups and/or acid are determined by potentiometric assays after dissolution of the polyamide. A method is described for example in "Encyclopedia of Industrial Chemical Analysis", Volume 17, page 293, 1973. The amounts of amine end groups (GTA) and/or acid (BMS) can be determined by potentiometric titration after complete dissolution of the polyamide in trifluoroethanol, and addition of a strong base in excess. The basic species are then titrated with an aqueous solution of strong acid. The amount of chain limiter is calculated by the ratio between the molar amount of added chain limiter and the mass of product polymer. The amount of chain limiter can also be determined by hydrolyzing the polyamide followed by analysis by liquid chromatography.

Obtaining a polyamide 6,6 unbalanced amine can be achieved in various ways known to those skilled in the art, such as for example during polymerization depending on the stoichiometric imbalance of diamine compounds and diacids, or during extrusion by addition of compounds to obtain a polyamide 6,6 unbalanced final amine.

In terms of lower limits, the composition may include polyamide in an amount of at least 40 wt. %, e.g., at least 42.5 wt. %, at least 45 wt. %, at least 47.5 wt. %, at least 50 wt. %, or at least 55 wt. %. In terms of upper limits, the composition may include polyamide in an amount of 70 wt. % or less, 68 wt. % or less, 66 wt. % or less, 64 wt. % or less, 62 wt. % or less, or 60 wt. % or less. In terms of ranges, the composition may include polyamide in an amount from 40 to 70 wt. %, e.g., from 42.5 to 68 wt. %, from 45 to 66 wt. %, from 47.5 to 64 wt. %, from 50 to 62 wt. %, or from 55 to 60 wt. %.

Synergist

The synergist used in the composition described herein may vary widely. In some aspects, the synergist may be a phosphorus-containing compound. In some aspects, the synergist is a phosphate, such as a polyphosphate. Exemplary synergists include phosphinate, aluminum diethyl-phosphinate, and melamine polyphosphate. Further examples include condensation products of melamine and/or reaction products of melamine with polyphosphoric acid and/or reaction products of condensation products of melamine with polyphosphoric acid, or mixtures thereof or comprises melem, melam, melon, dimelamine pyrophosphate, melamine polyphosphate, melem polyphosphate, melam polyphosphate, melon polyphosphate and/or mixed polysalts thereof or comprises nitrogen-containing phosphates of the formulae $(NH_4)_y H_{3-y} PO_4$ and/or $(NH_4 PO_3)$, where y is 1 to 3 and z is 1 to 10000. Yet further examples include mixed alkali-aluminum phosphites and mixtures thereof with alkali metal salts.

In some aspects, the synergist may be a non-phosphorus containing synergist. An exemplary additional synergist includes a silicone powder sold by Dow Corning® as 43-821. Additional synergists include zinc borate, calcium hypophosphite, aluminum hydrogenphosphites in combination with aluminum salts.

In terms of lower limits, the composition may include a synergist in an amount of at least 0.1 wt. %, e.g., at least 0.5 wt. %, at least 1 wt. %, at least 2 wt. %, at least 3 wt. %, or at least 4 wt. %. In terms of upper limits, the composition may include a synergist in an amount of 15 wt. % or less, 14 wt. % or less, 13 wt. % or less, 12 wt. % or less, 11 wt. % or less, or 10 wt. % or less. In terms of ranges, the composition may include a synergist in an amount from 0.1 to 15 wt. %, e.g., from 0.5 to 14 wt. %, from 1 to 13 wt. %, from 2 to 12 wt. %, from 3 to 11 wt. %, or from 4 to 10 wt. %.

Additives

In some aspects, the composition may also include various additives such as fillers, reinforcing agents, stabilizers, colorants, and the like, with the proviso that the additives do not adversely affect the desired properties of the thermoplastic compositions. Mixtures of additives may be used. Such additives may be mixed at a suitable time during the mixing of the components for forming the polymeric composition.

Examples of other suitable additives include flow modifiers, heat stabilizers, fillers, and combinations thereof. In general, the additives may be present in an amount of at least 0.05 wt. %, e.g., at least 0.1 wt. %, at least 0.5 wt. %, at least 1 wt. %, at least 5 wt. %, or at least 10 wt. %. In terms of upper limits, additives may be present in an amount from 55 wt. % or less, from 52.5 wt. % or less, from 50 wt. % or less, from 47.5 wt. % or less, or from 45 wt. % or less. In terms of ranges, additives may be present in an amount from 0.05 to 55 wt. %, e.g., from 0.5 to 52.5 wt. %, from 1 to 50 wt. %, from 5 to 47.5 wt. %, or from 10 to 45 wt. %.

In some aspects, the composition may include fiberglass. The fiberglass may be present in an amount of at least 5 wt. %, e.g., at least 10 wt. %, at least 12.5 wt. %, at least 15 wt. %, at least 20 wt. %, or at least 25 wt. %. In terms of upper limits, the fiberglass may be present in an amount from 45 wt. % or less, from 42.5 wt. % or less, from 40 wt. % or less, from 37.5 wt. % or less, or from 35 wt. % or less. In terms of ranges, the fiberglass may be present in an amount from 5 to 45 wt. %, e.g., from 10 to 42.5 wt. %, from 12.5 to 40 wt. %, from 15 to 37.5 wt. %, from 20 to 35 wt. %, or from 25 to 35 wt. %.

In some aspects, one or more heat stabilizers may be included in the composition. Suitable heat stabilizer additives include, for example, organophosphites such as triphenyl phosphite, tris-(2,6-dimethylphenyl)phosphite, tris-(mixed mono-and di-nonylphenyl)phosphite or the like; triphenyl phosphines, phosphonates such as dimethylbenzene phosphonate, or the like, phosphates such as trimethyl phosphate, or the like, or combinations comprising at least one of the foregoing heat stabilizers. In some aspects, the heat stabilizer is a copper-containing heat stabilizer comprising a copper halide and an organophosphorus compound. The organophosphorus compound may be triphenyl phosphine or triphenylphosphite. The organophosphorus compound and the copper halide may form a complex, e.g., copper(I) halide/bis (triphenylphosphine), copper(I) halide/bis (triphenylphosphite), copper(I) iodide/bis (triphenylphosphine), and/or copper(I) iodide/bis (triphenylphosphite). In some aspects, the heat stabilizer may comprise bromine, such that the loading in the final compound contains less than 900 ppm bromine, resulting in a "non-halogen rating." In some aspects, the heat stabilizer may comprise copper that is complexed or otherwise in a form that reduces water solubility and/or prevents migration of the copper, e.g., non-migratory copper, in order to reduce contact corrosion of copper from the final product.

The heat stabilizer may be present in an amount of at least 0.05 wt. %, e.g., at least 0.1 wt. %, at least 0.25 wt. %, at least 0.5 wt. %, at least 0.75 wt. %, at least 1 wt. %, or at least 1.5 wt. %. In terms of upper limits, the heat stabilizer may be present in an amount from 5 wt. % or less, from 4.5 wt. % or less, from 4.25 wt. % or less, from 4 wt. % or less, from 3.75 wt. % or less, or from 3.5 wt. % or less. In terms of ranges, the heat stabilizer may be present in an amount from 0.05 to 5 wt. %, e.g., from 0.1 to 4.75 wt. %, from 0.25 to 4.5 wt. %, from 0.5 to 4.25 wt. %, from 0.75 to 4 wt. %, from 1 wt. % to 3.75 wt. %, or from 1.5 to 3.5 wt. %.

In some aspects, the heat stabilizer may comprise a CuI, KI heat stabilizer and/or a Br, Cu, P heat stabilizer. In these aspects, the CuI, KI heat stabilizer may be present in an amount of at least 0.1 wt. %, e.g., at least 0.25 wt. %, at least 0.5 wt. %, at least 0.75 wt. %, at least 1 wt. %, or at least 1.5 wt. %. In terms of upper limits, the CuI, KI heat stabilizer may be present in an amount from 4 wt. % or less, from 3.75 wt. % or less, from 3.5 wt. % or less, or from 3 wt. % or less. In terms of ranges, the CuI, KI heat stabilizer may be present in an amount from 0.1 to 4 wt. %, e.g., from 0.25 to 3.75 wt. %, from 0.5 to 3.5 wt. %, from 0.75 to 3.25 wt. %, from 1 wt. % to 3 wt. %, or from 1.5 to 3 wt. %. In these aspects, the Br, Cu, P heat stabilizer may be present in an amount of at least 0.01 wt. %, e.g., at least 0.05 wt. %, at least 0.075 wt. %, or at least 0.1 wt. %. In terms of upper limits, the Br, Cu, P heat stabilizer may be present in an amount from 1.5 wt % or less, 1 wt. % or less, from 0.75 wt. % or less, or from 0.5 wt. % or less. In terms of ranges, the Br, Cu, P heat stabilizer may be present in an amount from 0.01 to 1.5 wt. %, e.g., from 0.05 to 1 wt. %, from 0.1 to 0.75 wt. %, or from 0.1 to 0.5 wt. %.

Additional fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as titanium dioxide, aluminum oxide, magnesium oxide, or the like; calcium sulfate (as its anhydride, dihydrate or trihydrate); single crystal fibers or "whiskers" such as silicon carbide, alumina, boron carbide, iron, nickel, copper, or the like; fibers (including continuous and chopped fibers) such as carbon fibers, glass fibers, such as E glass, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, or the like; as well as additional fillers and reinforcing agents such as mica, feldspar, flue dust, fillite, quartz, quartzite, perlite, tripoli, diatomaceous earth, carbon black, or the like, or combinations comprising at least one of the foregoing fillers or reinforcing agents. In some aspects, the composition is free of aromatic polyamides.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, though, for example, co-weaving or core/sheath, side-by-side or matrix and fibril constructions, or by other methods known to one skilled in the art of fiber manufacture. Suitable co-woven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. In some aspects, the composition is free of a layered silicate. Additionally, in some aspects, the composition is free of ammonium polyphosphate and zinc polyphosphate. In still further aspects, the composition is free of melamine cyanurate and zinc borate.

An antioxidant or "stabilizer" (e.g., a hindered phenol and/or secondary aryl amine) and, optionally, a secondary antioxidant (e.g., a phosphate and/or thioester) may also be included as an additive. Suitable stabilizer additives include, for example, metal phosphites such as sodium, calcium, or aluminum phosphite, or sodium, calcium, or aluminum hypophosphite, etc. Other suitable antioxidants include organophosphites such as tris(nonyl phenyl)phosphite, tris (2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyDoxy]-2,2-bis[[(2-cyano-3, 3-diphenylacryloyl) oxyl methyll propane (UVINUL™ 3030); 2,2'(1,4-phenylene) bis(4H-3,1-benzoxazin-4-one); 1,3-bis[(2-cyano-3, 3-diphenylacryloyl)oxy]-2,2-bis[[(2-cyano-3,3-diphenylacryloyl)oxy]methyllpropane; nano-size inorganic materials such as titanium oxide, cerium oxide, and zinc oxide, all with particle size less than about 100 nanometers; or the like, or combinations comprising at least one of the foregoing UV absorbers. based on 100 parts by weight of the polymeric components of the polymeric composition.

In some aspects, the fillers include zinc borate and zinc stearate. When included, the fillers may be present in an amount of at least 0.01 wt. %, e.g., at least 0.05 wt. %, at least 0.075 wt. %, or at least 0.1 wt. %. In terms of upper limits, the fillers may be present in an amount from 5 wt. % or less, from 4.75 wt. % or less, from 4.5 wt. % or less, or from 4.25 wt. % or less. In terms of ranges, the fillers may be present in an amount from 0.01 to 5 wt. %, e.g., from 0.05 to 4.75 wt. %, from 0.1 to 4.5 wt. %, or from 0.1 to 4.5 wt. %.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments.

These additional additives, when present, may be present in an amount of at least 0.01 wt. %, e.g., at least 0.05 wt. %, at least 0.075 wt. %, or at least 0.1 wt. %. In terms of upper limits, the additional additives may be present in an amount from 4 wt. % or less, from 3 wt. % or less, from 2.75 wt. % or less, or from 2.5 wt. % or less. In terms of ranges, the additional additives may be present in an amount from 0.01 to 4 wt. %, e.g., from 0.05 to 3 wt. %, from 0.1 to 2.75 wt. %, or from 0. to 2.5 wt. %.

Method of Forming the Final Molded Product

As described herein, the composition may be compounded and then extruded or injection molded to form a final product. In some aspects, by using a polyamide resin having a ratio of carboxylic acid to amine end groups of greater than 1.8, pressure spikes are avoided during extrusion. Additional benefits during extrusion, including control of the increase of molecular weight, are described herein.

Applications

The inventive compositions are useful in a variety of applications due to their thermal stability, flowability, processability, and recyclability. The products may be used in electric and electrical applications, including in connectors, relays, terminal blocks, motors, walls plates, lighting, circuit breakers, switches, and sensors, as well as other applications.

The unique characteristics of the compositions of the disclosure provide functionality and benefits not seen in conventional products, for example, existing flame-retardant resins and product formed therefrom.

Embodiments

Embodiment 1: A flame retardant polyamide composition comprising a polyamide, a non-halogenated flame retardant, and a synergist, wherein the polyamide has a ratio of carboxylic acid end groups to amine end groups of greater than 1.8.

Embodiment 2: An embodiment of embodiment 1, wherein the composition further comprises one or more additives.

Embodiment 3: An embodiment of embodiments 1 or 2, wherein the one or more additives comprise a flow modifier, a heat stabilizer, a filler, or combinations thereof.

Embodiment 4: An embodiment of any of embodiments 1 to 3, wherein the weight average molecular weight of the composition is from 20,000 to 100,000 Daltons, from 25,000 to 65,000 Daltons, or from 30,000 to 50,000 Daltons.

Embodiment 5: An embodiment of any of embodiments 1 to 4, wherein the z-average molecular weight is from 30,000 to 600,000, from 35,000 to 220,000 Daltons, from 40,000 to 120,000 Daltons, or from 45,000 to 90,000 Daltons.

Embodiment 6: An embodiment of any of embodiments 1 to 5, wherein the composition comprises from 35 to 70 wt. % polyamide, based on the total weight of the composition.

Embodiment 7: An embodiment of any of embodiments 1 to 6, wherein the composition comprises from 5 to 25 wt. % non-halogenated flame retardant, based on the total weight of the composition.

Embodiment 8: An embodiment of any of embodiments 1 to 7, wherein the composition comprises from 0.1 to 15 wt. % synergist, based on the total weight of the composition.

Embodiment 9: An embodiment of any of embodiments 1 to 8, wherein the composition further comprises from 5 to 45 wt. % fiberglass, based on the total weight of the composition.

Embodiment 10: An embodiment of any of embodiments 1 to 9, wherein the composition comprises from 0.05 to 5 wt. % heat stabilizer, based on the total weight of the composition.

Embodiment 11: An embodiment of any of embodiments 1 to 10, wherein the non-halogenated flame retardant comprises an organic phosphorus flame retardant.

Embodiment 12: An embodiment of any of embodiments 1 to 11, wherein the synergist comprises a polyphosphate.

Embodiment 13: An embodiment of any of embodiments 1 to 12, wherein the synergist comprises melamine polyphosphate.

Embodiment 14: An embodiment of any of embodiments 1 to 13, wherein the polyamide comprises less than 50 µq/gram amine end groups.

Embodiment 15: An embodiment of any of embodiments 1 to 14, wherein the polyamide comprises nylon 6,6.

Embodiment 16: A molded flame retardant polyamide product formed from the composition of any of embodiments 1 to 15.

Embodiment 17: A method of forming a molded product comprising: a) forming a polyamide having a ratio of carboxylic acid to amine end groups of greater than 1.8; b) compounding the polyamide with a non-halogenated flame retardant and a synergist comprising a phosphorus-containing compound to form a compounded composition; and c) molding the compounded composition to form the molded product.

Embodiment 18: An embodiment of embodiment 17, the composition further comprises one or more additives.

Embodiment 19: An embodiment of embodiments 17 or 18, wherein the one or more additives comprise a flow modifier, a heat stabilizer, a filler, or combinations thereof.

Embodiment 20: An embodiment of any of embodiments 17 to 19, wherein the weight average molecular weight of the product is from 20,000 to 100,000.

Embodiment 21: An embodiment of any of embodiments 17 to 20, wherein the z-average molecular weight of the product is from 50,000 to 600,000.

Embodiment 22: An embodiment of any of embodiments 17 to 21, wherein the product comprises from 40 to 70 wt. % nylon 6,6, based on the total weight of the product.

Embodiment 23: An embodiment of any of embodiments 17 to 22, wherein the product comprises from 5 to 25 wt. % non-halogenated flame retardant, based on the total weight of the product.

Embodiment 24: An embodiment of any of embodiments 17 to 23, wherein the product comprises from 0.1 to 15 wt. % synergist, based on the total weight of the product.

Embodiment 25: An embodiment of any of embodiments 17 to 24, wherein the product further comprises from 5 to 45 wt. % fiberglass, based on the total weight of the product.

Embodiment 26: An embodiment of any of embodiments 17 to 25, wherein the composition comprises from 0.05 to 5 wt. % heat stabilizer, based on the total weight of the composition.

Embodiment 27: An embodiment of any of embodiments 17 to 26, wherein the non-halogenated flame retardant comprises an organic phosphorus flame retardant.

Embodiment 28: An embodiment of any of embodiments 17 to 27, wherein the synergist comprises a polyphosphate.

Embodiment 29: An embodiment of any of embodiments 17 to 28, wherein the synergist comprises melamine polyphosphate.

Embodiment 30: An embodiment of any of embodiments 17 to 29, wherein the polyamide comprises nylon 6,6.

Embodiment 31: A flame retardant polyamide composition comprising: from 40 to 70 wt. % of a polyamide, from 5 to 25 wt. % of a non-halogenated flame retardant; from 0.1 to 15 wt. % of a synergist; from 5 to 45 wt. % fiberglass; and from 0.05 to 5 wt. % of a heat stabilizer, wherein the polyamide has a ratio of carboxylic acid end groups of amine end groups of greater than 1.8:1.

Embodiment 32: A flame retardant polyamide composition comprising: from 40 to 70 wt. % of a polyamide, from 5 to 25 wt. % of a non-halogenated flame retardant; from 0.1 to 15 wt. % of a synergist; and from 0.05 to 5 wt. % of a heat stabilizer, wherein the polyamide has a ratio of carboxylic acid end groups of amine end groups of greater than 1.8:1.

Embodiment 33: A method for controlling the RV of a polyamide, the method comprising: determining the desired RV for a polyamide; and adjusting the value of at least one of the amine end groups, the inert end groups, or the carboxylic acid end groups; wherein the polyamide has a ratio of carboxylic acid end groups of amine end groups of greater than 1.8:1.

Embodiment 34: An embodiment according to embodiment 33, wherein the desired RV is at least 20 or at least 35.

Embodiment 35: An embodiment according to any of embodiments 33-34, wherein the polyamide is nylon 6,6.

Embodiment 36: An embodiment according to any of Embodiments 1-35, wherein no flow modifier is used.

Embodiment 37: A flame retardant polyamide composition comprising a polyamide, a non-halogenated flame retardant, and a synergist, wherein the composition meets at least one of the following conditions: (a) the weight average molecular weight of the final composition is less than 300% greater than the weight average molecular weight of a starting polyamide resin; (b) the number average molecular weight of the final composition is less than 100% greater than the number average molecular weight of a starting polyamide resin; (c) the Z-average molecular weight of the final composition is less than 100% greater than the Z-average molecular weight of a starting polyamide resin; (d) the polydispersity index of the final composition is less than 300% greater than the weight average molecular weight of a starting polyamide resin; or (e) the intrinsic viscosity of the final composition is less than 100% greater than the intrinsic viscosity of a starting polyamide resin.

The present disclosure is further understood by the following non-limiting examples.

EXAMPLES

Example 1

Four sample nylon 6,6 resins were prepared with the viscosity and end groups shown below.

TABLE 1

| | Nylon 6,6 resins | | | |
| --- | --- | --- | --- | --- |
| | Resin | | | |
| | A | B | C | D |
| Relative Viscosity | 42 | 36 | 48 | 36 |
| Amine End Groups (μeq/gram) | 34 | 42 | 42 | 51 |

TABLE 1-continued

| | Nylon 6,6 resins | | | |
| --- | --- | --- | --- | --- |
| | Resin | | | |
| | A | B | C | D |
| Carboxylic Acid End Groups (μeq/gram) | 93 | 102 | 65 | 92 |
| Inert End Groups (μeq/gram) | 11 | 10 | 20 | 10 |
| Ratio Carboxylic Acid to Amine End Groups | 2.7 | 2.4 | 1.5 | 1.8 |
| Catalyst Included? | No | No | Yes | No |
| Mn | 15,200 | 17,500 | 18,400 | 14,900 |
| Mw | 27,700 | 26,400 | 32,200 | 26,000 |
| Mz | 43,900 | 38,000 | 50,700 | 40,700 |
| PDI | 1.82 | 1.51 | 1.75 | 1.74 |
| IV (dl/g) | 2.32 | 2.20 | 2.58 | 2.25 |

Each of the above resins was then combined with a flame retardant and a synergist as described herein. The initial Mw, Mz, PDI, and IV of the resins were measured and then the final Mw, Mz, PDI and IV of the overall composition after compounding was measured. Resins A and B, which had a ratio of carboxylic to amine end groups of greater than 1.8, were found to have acceptable increases in Mw, Mz, PDI, and IV during compounding. Resins C and D, which had a ratio of carboxylic to amine end groups of 1.8 or less, were found to have unacceptable increases in Mw, Mz, PDI, and/or IV during compounding. Additionally, during compounding, Resin D experienced undesirable pressure spikes in the extruder. One can reduce the screw speed or alter the screw design to reduce pressure build, but lower production rates are less economical, and less aggressive screw designs may not provide adequate mixing of the additive components.

Example 2

Five sample compositions were prepared with the components described below. As shown the amounts of polyamide, flame retardant, flow modifier, and synergist were varied. The polyamide in Samples 1-2 was nylon 6,6 Resin D. The polyamide in Samples 3-5 was nylon 6,6 Resin B. The flow modifier/synergist was a silicone powder sold by Dow Corning® as 43-821. The flame retardant was a phosphorus flame retardant sold by Clariant as Exolit® OP-1230 or Exolit® OP-1400. The vacuum applied to the extruder for Samples 1-3 was between −27 and −28 mmHg, and the vacuum applied to the extruder for Samples 4-5 was −22 mmHg. Examples 1 and 2 utilized polyamide Resin D and were found to have unacceptable increases in Mw, Mz, PDI, and IV. Examples 3 and 5 show that increasing the amount of vacuum applied to the extruder can cause the system to become too dry, which can enhance molecular weight build; therefore, it is best to operate the vacuum to a moderate level to minimize molecular weight build during compounding. Example 4 shows that molecular weight build during compounding was somewhat less for Exolit® OP-1400 vs. Exolit® OP-1230.

TABLE 2

Test Results for Samples 1 to 5

| | Sample | | | | |
|---|---|---|---|---|---|
| | 1 (Comparative) | 2 (Comparative) | 3 | 4 | 5 |
| Vacuum (in Hg) | −28 | −28 | −27 | −22 | −22 |
| Polyamide Resin Type | D | D | B | B | B |
| Polyamide | 50.8 | 51.3 | 55.6 | 55.6 | 55.6 |
| CuI, KI Heat Stabilizer | 1.5 | 1.5 | 1.5 | 1.5 | 1.5 |
| Fiberglass | 30.0 | 30.0 | 25.0 | 25.0 | 25.0 |
| Exolit® OP-1230 | — | — | — | 13.5 | — |
| Exolit® OP-1400 | 13.5 | 13.5 | 13.5 | — | 13.5 |
| Flow Modifier/synergist | 2.0 | 2.0 | 2.0 | 2.0 | 2.0 |
| Heat Stabilizer | 0.3 | 0.3 | 0.3 | 0.3 | 0.3 |
| Zinc Borate | 0.5 | — | 0.5 | 0.5 | 0.5 |
| Zinc Stearate | 0.1 | 0.1 | 0.1 | 0.1 | 0.1 |
| Ground Resin C | 1.0 | 1.0 | 1.0 | 1.0 | 1.0 |
| Antioxidant | 0.3 | 0.3 | 0.50 | 0.50 | 0.50 |
| Starting Mn | 17,500 | | | 14,900 | |
| Final Mn | 24,400 | 23,800 | 20,000 | 18,300 | 17,800 |
| Percent Increase (%) | 39 | 36 | 34 | 23 | 27 |
| Starting Mw | 26,400 | | | 26,000 | |
| Final Mw | 77,900 | 91,100 | 45,700 | 39,400 | 36,700 |
| Percent Increase (%) | 195 | 245 | 76 | 52 | 41 |
| Starting Mz | 43,900 | | | 40,700 | |
| Final Mz | 273,700 | 511,600 | 104,300 | 78,400 | 70,580 |
| Percent Increase (%) | 523 | 1065 | 156 | 93 | 73 |
| Starting PDI | 1.51 | | | 1.74 | |
| Final PDI | 3.19 | 3.83 | 2.29 | 2.15 | 2.10 |
| Percent Increase (%) | 111 | 154 | 32 | 24 | 21 |
| Starting IV (dl/g) | 2.20 | | | 2.25 | |
| Final IV (dl/g) | 3.42 | 3.51 | 2.86 | 2.65 | 2.58 |
| Percent Increase (%) | 55 | 60 | 27 | 18 | 15 |

Example 3

Ten sample compositions were prepared with the components described below. As shown the amounts of polyamide, flame retardant, and synergist were varied. The polyamide in Samples 6-8 and 11-15 was nylon 6,6 Resin B. The polyamide in Sample 9 was nylon 6,6 Resin A. The polyamide in Sample 10 was nylon 6,6 Resin C. The synergist in Samples 6-7, 9-13, and 15 was melamine polyphosphate, sold by JLS. The synergist in Sample 14 was a high thermal stability melamine polyphosphate. Samples 11-12 included a flow modifier sold by Chemigon® as TP-P1507. The flame retardant in each sample was a phosphorus flame retardant sold by Clariant as either Exolit® OP-1230 or Exolit® OP-1400.

TABLE 3

Test Results for Samples 6 to 15

| | Sample | | | | | | | | | |
|---|---|---|---|---|---|---|---|---|---|---|
| | 6 | 7 | 8 | 9 | 10 (Comparative) | 11 | 12 | 13 | 14 | 15 |
| Polyamide Resin Type | B | B | B | A | C | B | B | B | B | B |
| Polyamide | 60.1 | 59.1 | 50.6 | 50.1 | 50.1 | 49.6 | 49.1 | 47.3 | 50.1 | 50.1 |
| CuI, KI Heat Stabilizer | 1.5 | 1.5 | 1.5 | 1.5 | 1.5 | 1.5 | 1.5 | 1.5 | 1.5 | 1.5 |
| Fiberglass | 15.0 | 15.0 | 25.0 | 25.0 | 25.0 | 25.0 | 25.0 | 30.0 | 25.0 | 25.0 |
| Exolit® OP-1230 | 13.0 | 14.0 | — | 14.0 | 14.0 | 14.0 | 14.0 | 14.0 | 14.0 | 14.0 |
| Exolit® OP-1400 | — | — | 20.0 | — | — | — | — | — | — | — |
| Synergist | 7.50 | 7.50 | — | 6.50 | 6.50 | 6.50 | 6.50 | 5.50 | 6.50 (MPP350) | 6.50 |
| Heat Stabilizer | 0.30 | 0.30 | 0.30 | 0.30 | 0.30 | 0.30 | 0.30 | — | 0.30 | 0.30 |
| Zinc Borate | 0.50 | 0.50 | 0.50 | 0.50 | 0.50 | 0.50 | 0.50 | 0.50 | 0.50 | 0.50 |
| Zinc Stearate | 0.10 | 0.10 | 0.10 | 0.10 | 0.10 | 0.10 | 0.10 | 0.10 | 0.10 | 0.10 |
| Ground Resin C | 2.0 | 2.0 | 2.0 | 2.0 | 2.0 | 2.0 | 2.0 | 0.6 | 2.0 | 2.0 |
| Flow Modifier | — | — | — | — | — | 0.50 | 1.00 | — | — | — |

TABLE 3-continued

Test Results for Samples 6 to 15

| | Sample | | | | | | | | | |
|---|---|---|---|---|---|---|---|---|---|---|
| | 6 | 7 | 8 | 9 | 10 (Comparative) | 11 | 12 | 13 | 14 | 15 |
| Starting Mn | | 17,500 | | 15,200 | 18,400 | | | 17,500 | | |
| Final Mn | 16,400 | | 14,900 | 17,200 | 19,700 | 17,100 | 15,900 | 17,800 | 21,700 | 17,900 |
| Percent Increase (%) | −6.3 | | −15 | 13 | 7 | −2.3 | −9.2 | 1.7 | 24 | 2.2 |
| Starting Mw | | 26,400 | | 27,700 | 32,200 | | | 26,400 | | |
| Final Mw | 37,200 | | 34,900 | 47,100 | 65,000 | 42,900 | 38,700 | 43,000 | 48,500 | 46,500 |
| Percent Increase (%) | 41 | | 32 | 70 | 103 | 63 | 47 | 63 | 84 | 76 |
| Starting Mz | | 38,000 | | 43,900 | 50,700 | | | 38,000 | | |
| Final Mz | 72,900 | | 66,600 | 117,400 | 223,100 | 94,600 | 82,600 | 100,600 | 122,300 | 106,200 |
| Percent Increase (%) | 92 | | 75 | 167 | 340 | 149 | 117 | 65 | 22 | 79 |
| Starting PDI | | 1.51 | | 1.82 | 1.75 | | | 1.51 | | |
| Final PDI | 2.27 | | 2.35 | 2.73 | 3.29 | 2.51 | 2.43 | 2.41 | 2.23 | 2.60 |
| Percent Increase (%) | 50 | | 56 | 50 | 88 | 66 | 61 | 60 | 48 | 72 |
| Starting IV (dg/l) | | 2.20 | | 2.32 | 2.58 | | | 2.20 | | |
| Final IV (dl/g) | 2.64 | | 2.49 | 2.70 | 3.15 | 1.78 | 2.51 | 2.81 | 2.80 | 2.73 |
| Percent Increase (%) | 20 | | 13 | 16 | 22 | −20.1 | 14 | 28 | 28 | 24 |

Example 4

Six sample compositions were prepared with the components described below. As shown the amounts of polyamide, flame retardant, and synergist were varied. The polyamide in Examples 16-21 was nylon 6,6 Resin B. The synergist in Examples 16-19 was melamine polyphosphate, sold by JLS. Examples 16-18 and 20-21 included a heat stabilizer sold by Brueggemann as TP-H1606. Example 19 included a heat stabilizer sold by Brueggemann as H3386. The flame retardant in each sample was a phosphorus flame retardant sold by Clariant as either Exolit® OP-1230 or Exolit® OP-1400.

TABLE 4

Test Results for Samples 16 to 21

| | Sample | | | | | |
|---|---|---|---|---|---|---|
| | 16 | 17 | 18 | 19 | 20 | 21 |
| Polyamide Resin Type | B | B | B | B | B | B |
| Polyamide | 52.3 | 51.3 | 50.5 | 53.1 | 51.8 | 51.0 |
| Fiberglass | 25.0 | 25.0 | 25.0 | 25.0 | 25.0 | 25.0 |
| Exolit® OP-1230 | 14.0 | 14.0 | 14.0 | 14.0 | — | — |
| Exolit® OP-1400 | — | — | — | — | 20.0 | 20.0 |
| Synergist | 6.50 | 6.50 | 6.50 | 6.50 | — | — |
| TP-H1606 Heat Stabilizer | 0.50 | 1.00 | 1.40 | — | 1.00 | 1.40 |
| H3386 Heat Stabilizer | — | — | — | 0.25 | — | — |
| Zinc Borate | 0.50 | 0.50 | 0.50 | 0.50 | 0.50 | 0.50 |
| Zinc Stearate | 0.10 | 0.10 | 0.10 | 0.10 | 0.10 | 0.10 |
| Ground Resin C | 1.10 | 1.60 | 2.00 | 0.60 | 1.60 | 2.00 |
| Starting Mn | | | 17,500 | | | |

TABLE 4-continued

Test Results for Samples 16 to 21

| | Sample | | | | | |
|---|---|---|---|---|---|---|
| | 16 | 17 | 18 | 19 | 20 | 21 |
| Final Mn | 20,300 | 17,837 | 17,300 | 18,000 | 15,600 | 17,600 |
| Percent Increase (%) | 16 | 1.9 | −1.2 | 2 | −10.9 | 0.57 |
| Starting MW | | | 26,400 | | | |
| Final Mw | 40,100 | 36,600 | 46,300 | 33,500 | 30,900 | 33,400 |
| Percent Increase (%) | 52 | 39 | 75 | 27 | 17 | 27 |
| Starting Mz | | | 38,000 | | | |
| Final Mz | 71,800 | 68,300 | 98,400 | 62,200 | 52,200 | 57,800 |
| Percent Increase (%) | 89 | 80 | 159 | 64 | 69 | 52 |
| Starting PDI | | | 1.51 | | | |
| Final PDI | 1.97 | 2.05 | 2.67 | 1.86 | 1.98 | 1.89 |
| Percent Increase (%) | 30 | 36 | 77 | 23 | 31 | 25 |
| Starting IV (dl/g) | | | 2.20 | | | |
| Final IV (dl/g) | 2.83 | 2.65 | 2.88 | 2.55 | 2.47 | 2.34 |
| Percent Increase (%) | 29 | 20 | 31 | 16 | 12 | 6.3 |

While the disclosure has been described in detail, modifications within the spirit and scope of the disclosure will be readily apparent to those of skill in the art. Such modifications are also to be considered as part of the present disclosure. In view of the foregoing discussion, relevant knowledge in the art and references discussed above in connection with the Background, the disclosures of which are all incorporated herein by reference, further description is deemed unnecessary. In addition, it should be understood from the foregoing discussion that aspects of the disclosure and portions of various embodiments may be combined or interchanged either in whole or in part. Furthermore, those of ordinary skill in the art will appreciate that the foregoing description is by way of example only, and is not intended to limit the disclosure. Finally, all patents, publications, and applications referenced herein are incorporated by reference in their entireties.

What is claimed is:

1. A flame retardant polyamide composition consisting of one or more polyamides, a non-halogenated flame retardant, a synergist and/or a flow modifier, fiberglass, a heat stabilizer, and a filler, wherein at least one of the one or more polyamide has a ratio of carboxylic acid end groups to amine end groups of greater than 1.8.

2. The composition according to claim 1, wherein the weight average molecular weight of the composition is from 20,000 to 100,000 Daltons.

3. The composition according to claim 1, wherein the z-average molecular weight is from 30,000 to 600,000 Daltons.

4. The composition according to claim 1, wherein the one or more polyamides are present in an amount from 35 to 70 wt. %, based on the total weight of the composition.

5. The composition according to claim 1, wherein the non-halogenated flame retardant is present in an amount from 5 to 25 wt. %, based on the total weight of the composition.

6. The composition according to claim 1, wherein the synergist and/or filler is present in an amount from 0.1 to 15 wt. %, based on the total weight of the composition.

7. The composition according to claim 1, wherein the fiberglass is present in an amount from 5 to 45 wt. %, based on the total weight of the composition.

8. The composition according to claim 1, wherein the heat stabilizer is present in an amount from 0.05 to 5 wt. %, based on the total weight of the composition.

9. The composition of claim 1, wherein the synergist is phosphinate, aluminum diethyl-phosphinate, melamine polyphosphate or silicone powder.

10. A flame retardant polyamide composition consisting of a one or more polyamides, a non-halogenated flame retardant, a synergist and/or a flow modifier, fiberglass, a heat stabilizer, and a filler, wherein the composition meets at least one of the following conditions:
    (a) the weight average molecular weight of the final composition is less than 300% greater than the weight average molecular weight of a starting polyamide resin;
    (b) the number average molecular weight of the final composition is less than 100% greater than the number average molecular weight of a starting polyamide resin;
    (c) the Z-average molecular weight of the final composition is less than 100% greater than the Z-average molecular weight of a starting polyamide resin;
    (d) the polydispersity index of the final composition is less than 300% greater than the weight average molecular weight of a starting polyamide resin; or
    (e) the intrinsic viscosity of the final composition is less than 100% greater than the intrinsic viscosity of a starting polyamide resin.

11. The composition of claim 10, wherein the synergist is phosphinate, aluminum diethyl-phosphinate, melamine polyphosphate or silicone powder.

* * * * *